US010642493B2

(12) United States Patent
Yang

(10) Patent No.: US 10,642,493 B2
(45) Date of Patent: May 5, 2020

(54) MOBILE DEVICE AND DATA MANAGEMENT METHOD OF THE SAME

(71) Applicant: SAMSUNG ELECTRONICS CO., LTD., Suwon-si (KR)

(72) Inventor: Seung-soo Yang, Hwaseong-si (KR)

(73) Assignee: SAMSUNG ELECTRONCIS CO., LTD., Suwon-si (KR)

( * ) Notice: Subject to any disclaimer, the term of this patent is extended or adjusted under 35 U.S.C. 154(b) by 101 days.

(21) Appl. No.: 15/059,998

(22) Filed: Mar. 3, 2016

(65) Prior Publication Data

US 2016/0259557 A1    Sep. 8, 2016

(30) Foreign Application Priority Data

Mar. 5, 2015  (KR) .................. 10-2015-0031118

(51) Int. Cl.
*G06F 3/06* (2006.01)
*G06F 12/0813* (2016.01)

(52) U.S. Cl.
CPC .......... *G06F 3/0608* (2013.01); *G06F 3/0604* (2013.01); *G06F 3/067* (2013.01); *G06F 3/0647* (2013.01); *G06F 12/0813* (2013.01); *G06F 2212/314* (2013.01)

(58) Field of Classification Search
CPC ...... G06F 12/08; G06F 3/0647; G06F 3/0604; G06F 12/0813; G06F 3/0644; G06F 3/067; G06F 3/0685; G06F 2212/314; G11C 7/1072
USPC ......................................................... 711/100
See application file for complete search history.

(56) References Cited

U.S. PATENT DOCUMENTS

| 5,784,459 | A | 7/1998 | Devarakonda et al. |
| 6,160,496 | A | 12/2000 | Scheuer |
| 7,003,646 | B2 | 2/2006 | Roy et al. |
| 7,421,562 | B2 | 9/2008 | Bhatt et al. |
| 8,037,255 | B2 | 10/2011 | Jeong et al. |
| 8,661,189 | B2 | 2/2014 | Post et al. |
| 8,930,647 | B1 * | 1/2015 | Smith ................. G06F 9/44557 711/103 |
| 2007/0005911 | A1 | 1/2007 | Yang et al. |
| 2007/0294496 | A1 * | 12/2007 | Goss .................. G06F 12/1408 711/163 |
| 2010/0161923 | A1 * | 6/2010 | GadelRab ............... G06F 12/02 711/162 |
| 2010/0312955 | A1 | 12/2010 | Hwang et al. |
| 2013/0007345 | A1 | 1/2013 | Barbou-Des-Places et al. |

(Continued)

FOREIGN PATENT DOCUMENTS

| JP | 2000-276363 A | 10/2000 |
| JP | 2010-128560 A | 6/2010 |

*Primary Examiner* — Hashem Farrokh
(74) *Attorney, Agent, or Firm* — Sughrue Mion, PLLC

(57) ABSTRACT

Provided are a mobile device and a data management method of the mobile device. The data management method that is processed by a central processing unit (CPU) of the mobile device includes: selecting data to be swapped from among data stored in a local memory of the mobile device, in response to a request to perform swapping on the data stored in the local memory; selecting one of at least two external memories which are located outside the mobile device and have different hierarchical levels; and swapping the selected data to the selected external memory.

20 Claims, 20 Drawing Sheets

(56) References Cited

U.S. PATENT DOCUMENTS

| | | | |
|---|---|---|---|
| 2014/0143577 A1* | 5/2014 | Nachimuthu | G06F 12/08 713/324 |
| 2014/0164686 A1 | 6/2014 | Choi et al. | |
| 2015/0113214 A1* | 4/2015 | Sutardja | G06F 12/0804 711/106 |
| 2015/0127897 A1* | 5/2015 | Liabraaten | G11C 7/1075 711/104 |
| 2015/0178186 A1* | 6/2015 | Wang | G06F 12/023 711/159 |
| 2015/0324119 A1* | 11/2015 | Romanovsky | G06F 12/08 711/103 |
| 2015/0324137 A1* | 11/2015 | Wu | G06F 3/0619 713/2 |
| 2015/0331812 A1* | 11/2015 | Horman | G06F 11/07 711/163 |
| 2016/0034195 A1* | 2/2016 | Li | G06F 13/382 711/117 |
| 2016/0092133 A1* | 3/2016 | Shimizu | G06F 3/0673 711/163 |
| 2016/0259571 A1* | 9/2016 | Kumasawa | G06F 3/06 |

* cited by examiner

US 10,642,493 B2

MOBILE DEVICE AND DATA MANAGEMENT METHOD OF THE SAME

CROSS-REFERENCE TO THE RELATED APPLICATION

This application claims priority from Korean Patent Application No. 10-2015-0031118, filed on Mar. 5, 2015, in the Korean Intellectual Property Office, the disclosure of which is incorporated herein in its entirety by reference.

BACKGROUND

Apparatuses and methods consistent with exemplary embodiments of the inventive concept relate to a mobile device and data management in the same, and more particularly, to a mobile device that may efficiently manage data by using limited resources and data management in the mobile device.

The amount of data that is processed in a mobile device has increased. Since a mobile device that may be carried is required to be compact, a memory of the mobile device has a limited capacity for storing or loading data. Accordingly, the amount of data that may be simultaneously processed is limited, thereby inconvenient to users. Also, data is frequently swapped in the memory having a limited capacity of the mobile device, thereby increasing power consumption.

SUMMARY

Exemplary embodiments of the inventive concept provide a mobile device that may efficiently manage data by using limited resources and a data management method of the mobile device.

According to an aspect of an exemplary embodiment, there is provided a data management method processed by a central processing unit (CPU) of a mobile device. The data management method may include: selecting data to be swapped from among data stored in a local memory of the mobile device, in response to a request to perform swapping on the data stored in the local memory; selecting one of at least two external memories which are located outside the mobile device and have different hierarchical levels; and swapping the selected data to the selected external memory.

The data management method may further include periodically checking a size of a free area in the local memory and generating the request in response to the size of the free area in the local memory being equal to or less than a reference value.

The data management method may further include generating the request in response to determining that certain data stored in the local memory is not to be used for a reference period of time or longer, a free area does not exist in the local memory, or an instruction to perform the swapping is received from a user.

The local memory may include at least two dynamic random-access memories (DRAMs) which includes a first DRAM and a second DRAM, wherein the data management method further includes generating the request in response to determining that at least one of the at least two DRAMs is to operate in a low power mode.

The selected data may be data stored in the first DRAM having a larger free area than the second DRAM, and the swapping may be performed by swapping the selected data from the first DRAM to the second DRAM.

The selecting the data to be swapped may include selecting the data to be swapped based on characteristics of the data stored in the local memory.

The selecting the data to be swapped may include selecting the data to be swapped based on a unit of the data stored in the local memory.

The selecting the data to be swapped may include selecting all data which are used in a same application.

The selecting one of the at least two external memories may include selecting one of the at least two external devices based on a re-use probability of the selected data.

The data management method may further include setting a hierarchical level of each of the at least two external memories based on at least one of a distance between each of the at least two external memories and the mobile device, and a resource used for the swapping.

The data management method may further include not killing all applications that are executed in the mobile device and maintaining a state where all of the applications are executed.

The data management method may further include swapping the selected data to a local storage which is electrically connected to the mobile device before the swapping the selected data to the selected external memory.

The data management method may further include swapping the selected data swapped to the local storage to the selected external memory.

The data management method may further include providing a user interface (UI) indicating a state of the swapping and the selecting one of the at least two external memories to a user.

According to an aspect of another exemplary embodiment, there is provided a data management method which may include: determining whether an event has occurred or occurs; selecting data to be swapped from among data stored in a local memory which is accessed by an application processor to execute a first application, in response to the determining that the event has occurred or occurs; and swapping the selected data to at least one memory from among at least one another memory in the mobile device or at least one another memory outside the mobile device to change an area occupied by the selected data in the local memory to a free area to be used by the application without stopping execution of a second application which currently uses the local memory.

Here, the event may include at least one of an event in which an existing free area in the local memory is equal to or less than a reference value, a command to stop execution of a third application which currently uses the local memory, an event indicating certain data stored in the local memory is processed not to be used for a predetermined period of time or longer, and an interrupt occurring at a predetermined time interval.

According to an aspect of still another exemplary embodiment, there is provided a mobile device which may include: an application processor configured to control execution of at least one application; and a local memory to which data requested to execute the application is loaded, wherein the application processor comprises: a remote swap manager configured to, while maintaining a state where all of the at least one application is executed in the mobile device, control an operation of swapping out data, selected from among data stored in the local memory, to an external memory located outside the mobile device or an operation of swapping in the data, swapped out to the external memory, to the local memory; a compressor configured to compress the data swapped out to the external memory; and a decompressor configured to decompress the data swapped in from the external memory.

BRIEF DESCRIPTION OF THE DRAWINGS

Exemplary embodiments of the inventive concept will be more clearly understood from the following detailed description taken in conjunction with the accompanying drawings, in which.

DETAILED DESCRIPTION OF THE EXEMPLARY EMBODIMENTS

Figure 1:
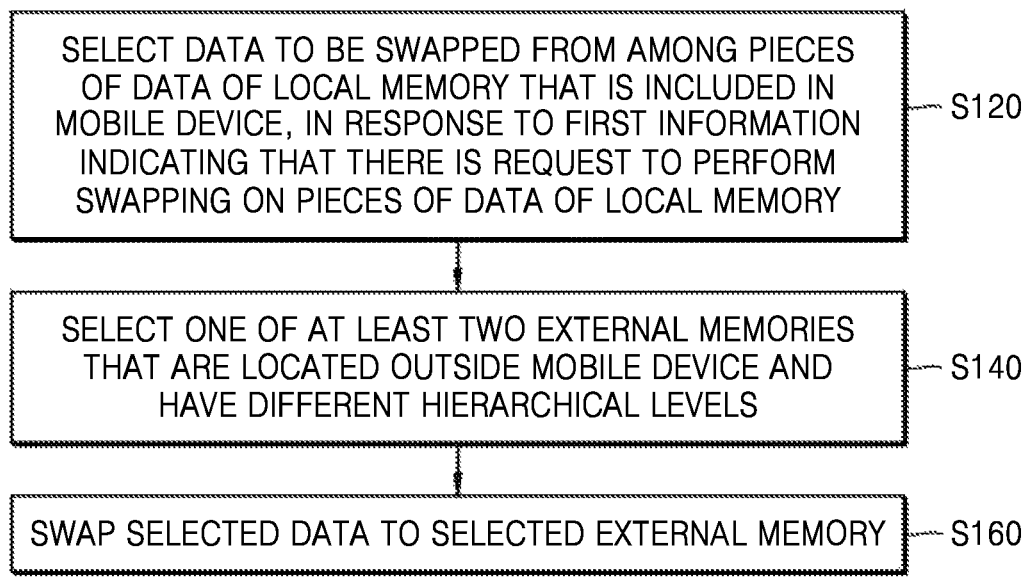
FIG. 1 is a flowchart of a data management method according to an exemplary embodiment.

The inventive concept will now be described more fully with reference to the accompanying drawings, in which exemplary embodiments of the inventive concept are shown. In the drawings, the same reference numerals denote the same elements.

Expressions such as "at least one of" when preceding a list of elements, modify the entire list of elements and do not modify the individual elements of the list.

FIG. 1 is a flowchart of a data management method according to an exemplary embodiment. Referring to FIG. 1, the data management method according to an exemplary embodiment includes operation S120 in which data to be swapped is selected from among data stored in a local memory that is included in a mobile device, in response to first information indicating that there is a request to perform swapping on the data stored in the local memory. Next, in operation S140, one of at least two external memories that are located outside the mobile device and have different hierarchical levels is selected, and, in operation S160, the selected data is swapped to the selected external memory.

The data management method of FIG. 1 may be processed by a central processing unit (CPU) 221 of a mobile device 200.

Figure 2:
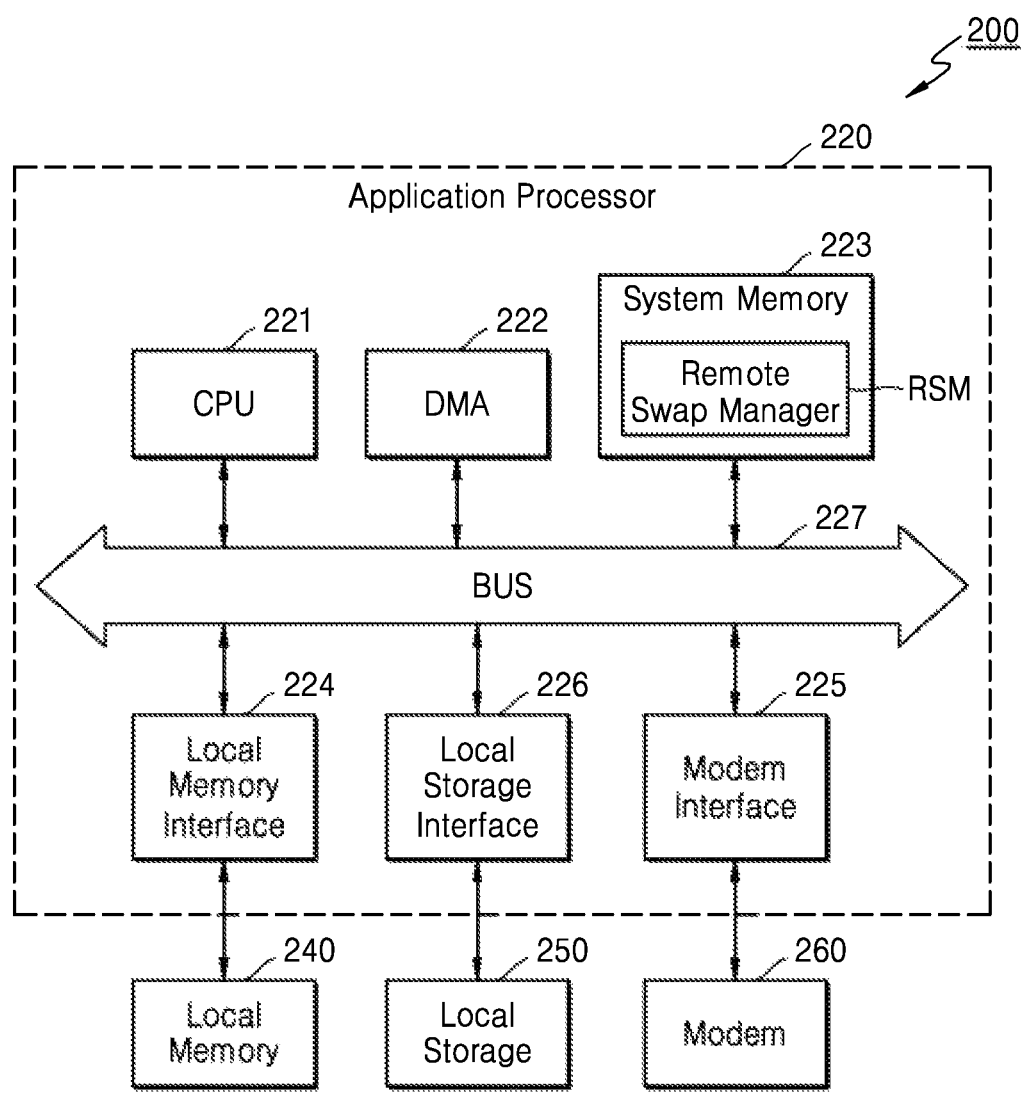
FIG. 2 is a block diagram illustrating a mobile device according to an exemplary embodiment.

FIG. 2 is a block diagram illustrating the mobile device 200 according to an exemplary embodiment. Referring to FIG. 2, the mobile device 200 may include an application processor 220, a local memory 240, a local storage 250, and a modem 260.

The application processor 220 may control an operation that is requested to be executed in the mobile device 200. The application processor 220 may include a direct memory access (DMA) 222, a system memory 223, a local memory interface 224, a local storage interface 226, a modem interface 225, and a bus 227 that electrically connects the DMA 222, the system memory 223, the local memory interface 224, the local storage interface 225, and the modem interface 226 to one another. Examples of the application processor 220 may include a system-on-chip.

The CPU 221 may perform arithmetic, data processing, and control operations of the application processor 220. The DMA 222 may control data transfer under the control of the CPU 221. For example, the DMA 222 may control data transfer between the system memory 223, the local memory 240, and the local storage 250.

Data that is requested for the CPU 221 to perform operations may be loaded to the system memory 223. For example, an operating system (OS) or a remote swap manager (RSM) may be located in the system memory 223. The RSM may control or perform operation S120 of selecting data to be swapped in response to the first information, operation S140 of selecting an external memory 320 to be swapped, and operation S160 of swapping the selected data to the selected external memory 320 in the data management method of FIG. 1. Furthermore, the RSM may generate the first information indicating that there is a request to perform swapping on data stored in the local memory 240, which will be explained below in detail. Examples of the system memory 223 may include static random-access memory (SRAM), dynamic random-access memory (DRAM), magnetic random-access memory (MRAM), ferroelectric random-access memory (FRAM), and resistive random-access memory (RRAM).

The local memory interface 224 may enable the application processor 220 to interface with the local memory 240. The local memory 240 may be used as a working memory of the application processor 220. For example, as an application is executed, data may be loaded from the application processor 220. Examples of the local memory 240 may include SRAM, DRAM, MRAM, FRAM, and RRAM. The following will be explained on the assumption that the local memory 240 is DRAM, for convenience of explanation.

The local storage interface 225 may enable the application processor 220 to interface with the local storage 250. The local storage 250 may store data so that the data is retained even when power supply to the mobile device 200 is cut off. Examples of the local storage 250 may include MRAM, FRAM, RRAM, a flash memory, a solid-state drive (SSD), and a hard disk drive (HDD). The following will be explained on the assumption that the local storage 250 is a flash memory, for convenience of explanation.

The modem interface 226 may enable the application processor 220 to interface with the modem 260. The modem 260 may support communication using at least one of various communication protocols such as WiFi, long term evolution (LTE), Bluetooth, and near-field communication (NFC). The application processor 220 may communicate with a remote system 300 via a network NT of FIG. 3, through the modem 260. The network NT may be a wireless or wired network. Examples of the remote system 300 may include various systems such as an apparatus such as a desktop computer or a tablet PC and a data server such as a cloud.

Figure 4:
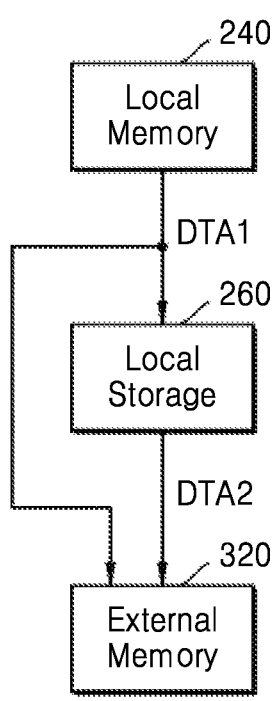
FIGS. 4 and 5 are block diagrams illustrating memory hierarchies for data swapping according to exemplary embodiments.

FIG. 4 is a block diagram illustrating a memory hierarchy for data swapping, according to an exemplary embodiment. Referring to FIGS. 2 and 4, data for executing at least one application may be loaded from the application processor 220 to the local memory 240. However, when there is no free area in the local memory 240 or a free area in the local memory 240 is equal to or less than a reference value, that is, when there is no sufficient space to load additional data in the local memory 240, data DTA1 that is stored in the local memory 240 may be swapped to another storage or memory in order to make a free area in the local memory 240. For example, when there is no sufficient space to load additional data in the local memory 240, first information indicating that the data DTA1 of the local memory 240 has to be swapped may be generated in the mobile device 200. For example, the first information may be generated by the RSM when a preset event or interrupt occurs. Alternatively, the first information may be generated by a virtual memory manager (not shown) that is loaded to the system memory 223 and may be transmitted to the RSM. A method of generating the first information will be explained below in detail.

Figure 3:
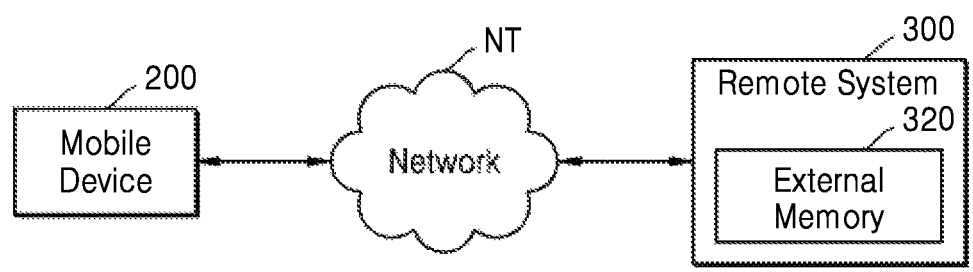
FIG. 3 is a block diagram illustrating the mobile device and a remote system, according to an exemplary embodiment.

For example, the data DTA1 that is stored in the local memory 240 may be directly swapped to the external memory 320 that is provided in the remote system 300 of FIG. 3. Alternatively, the data DTA1 that is stored in the local memory 240 may be first swapped to the local storage 250 that is provided in the mobile device 200. When there is no free area in the local storage 250 or a free area in the local storage 250 is equal to or less than a reference value, data DAT2 that is swapped to the local storage 250 may be swapped to the external memory 320.

The data management method of FIG. 1 does not have to kill an application that is being executed in order to make a free area in the local memory 240 by swapping data from the local memory 240 to the external memory 320, thereby enhancing user convenience. In addition, the data management method according to an exemplary embodiment may prevent the lifetime and performance of the local storage 250 that is located inside the mobile device 200 in which the number of write or erase operations is limited from being reduced by swapping data from the local memory 240 to the external memory 320.

Figure 5:
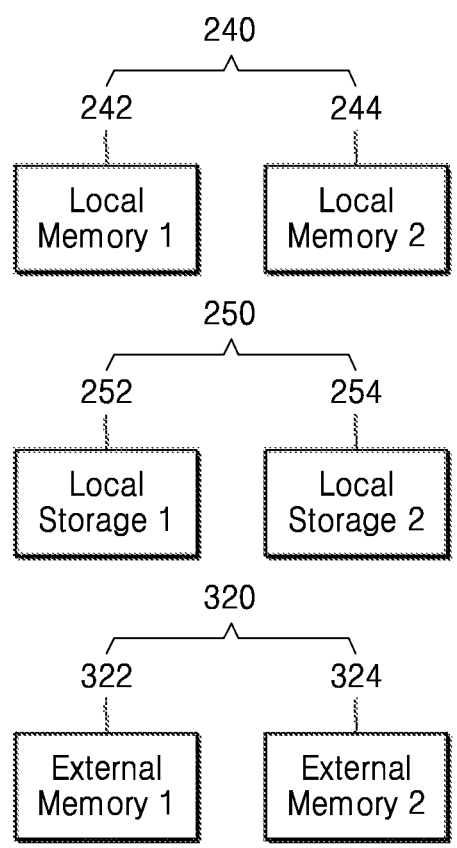

FIG. 5 is a block diagram illustrating a memory hierarchy for data swapping, according to another exemplary embodiment. Referring to FIGS. 2 and 5, a plurality of the local memories 240, a plurality of the local storages 250, and a plurality of the external memories 320 may be provided. For example, the local memory 240 may include a first local memory 242 and a second local memory 244. The local storage 250 may include a first local storage 252 and a second local storage 254. For example, the external memory 320 may include a first external memory 322 and a second external memory 324. Alternatively, three or more local memories 240, local storages 250, and external memories 320 may be provided.

The first external memory 322 and the second external memory 324 of the external memory 320 may have differential hierarchical levels. For example, an external memory to which data having a high re-use probability from among data swapped from the mobile device 200 is swapped and an external memory to which data having a low re-use probability from among the pieces of data swapped from the mobile device 200 is swapped may be distinguished and set. The external memories that are distinguished in this manner may be written to have different hierarchical levels. Hierarchical levels of the external memories 320 may be set based on different physical distances to the mobile device 200, different times or resources requested to perform swapping, or different functions of the external memories 320. For example, when a communication resource or a latency requested to perform a swap operation with the second external memory 324 is greater than that requested to perform the same swap operation with the first external memory 322, the second external memory 324 may be set to a higher level than that of the first external memory 322. A first external memory that is set to a higher level than a second external memory may have a higher operating speed than that of the second external memory As such, the data management method of FIG. 1 may avoid power consumption for frequent swap operations by selecting an external memory that is optimized for data swapping from among the plurality of external memories 320 that are hierarchically set. As a communication speed such as a speed of LTE has increased, a time taken to perform a swap operation with an external memory may decrease.

Figure 6:
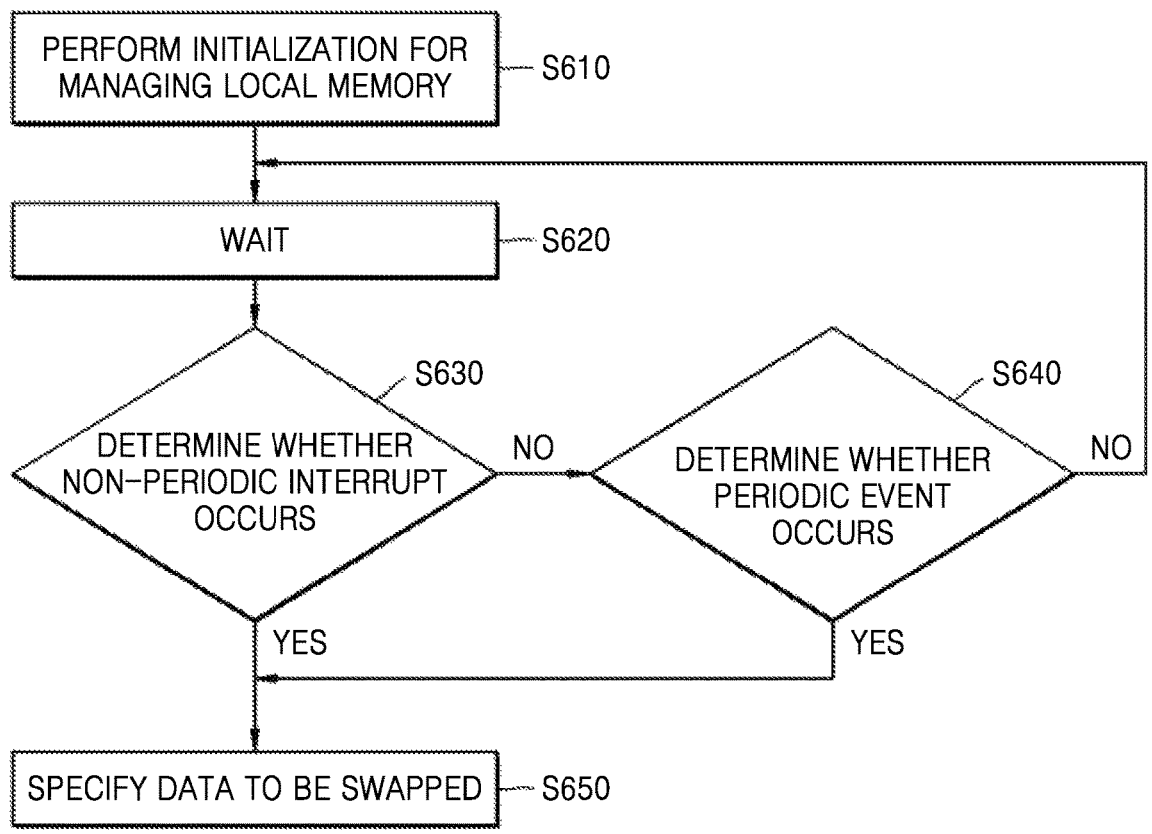
FIG. 6 is a flowchart of a method of generating first information, according to an exemplary embodiment

FIG. 6 is a flowchart of a method of generating first information, according to an exemplary embodiment. Referring to FIGS. 2 and 6, in operation S610, initialization for managing the local memory 240 is performed. In operation S620, a non-periodic interrupt (or a non-periodic event) or a periodic event is waited for. For example, the initialization for managing the local memory 240 may refer to initialization of meta information Inf_m that is included in swap information Inf_S of FIG. 11. In operation S630, it is determined whether a non-periodic interrupt occurs, and in operation S640, it is determined whether a periodic event occurs. If it is determined in operation S630 that a non-periodic interrupt occurs or if it is determined in operation S640 that a periodic event occurs, the method proceeds to operation S650. In operation S650, the first information may be generated.

Examples of a case where a non-periodic interrupt occurs may include, a case where data stored in the local memory 240 is processed not to be used for a predetermined period of time or longer, a case where there is no free area in the local memory 240, and a case where an instruction to perform swapping is directly received from a user. For example, a free area in the local memory 240 may be periodically checked by the RSM. If it is found that the free area is equal to or less than a reference value, it may be determined in operation S640 that a periodic event occurs. Alternatively, when data stored in the local memory 240 is first swapped to a swap area in the local storage 250, as shown in FIG. 4, a free area in the swap area in the local storage 250 may be periodically checked by the RSM. If it is found that the free area is equal to or less than a reference value, it may be determined in operation S640 that a periodic event occurs. Alternatively, when an instruction to kill an arbitrary application that is loaded to the local memory 240 and is being executed is received, it may be determined that a non-periodic interrupt occurs or a periodic event occurs. An OS of the mobile device 200 may process data stored in the local memory 240 not to be used for a predetermined period of time or longer, notify that there is no free area in the local memory 240, or instruct to kill an application.

Unlike in FIG. 6, the first information may be generated only when a periodic event occurs without taking into account a non-periodic interrupt. Also, although whether swapping is requested is mainly determined based on a free area in the local memory 240 in the above, the present exemplary embodiment is not limited thereto. The data management method according to an exemplary embodiment may perform a swap operation in order to avoid power consumption, which will now be explained.

Figure 7:
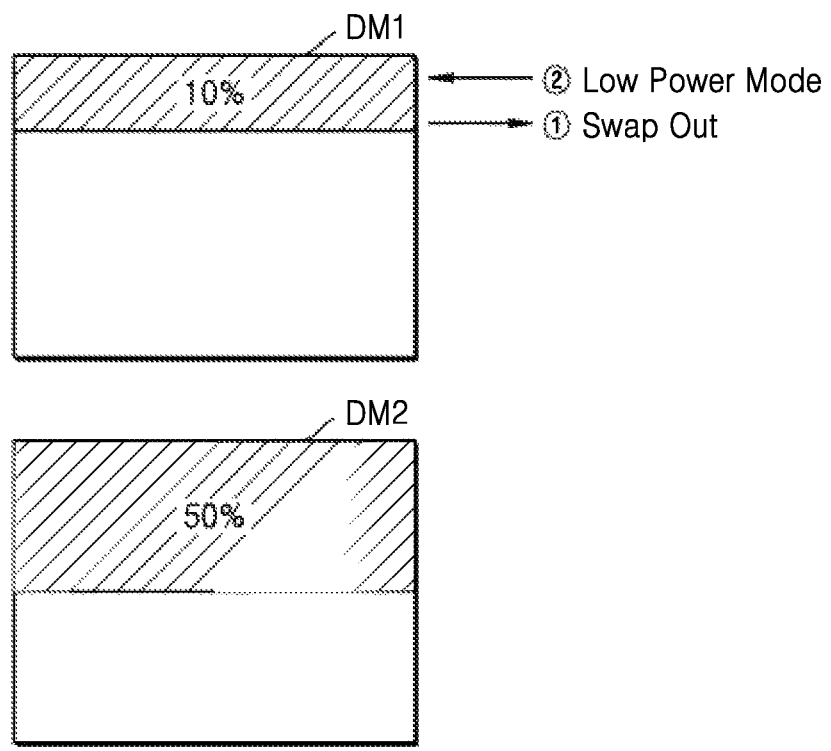
FIGS. 7 and 8 are diagrams for explaining data management methods according to exemplary embodiments.
Figure 8:
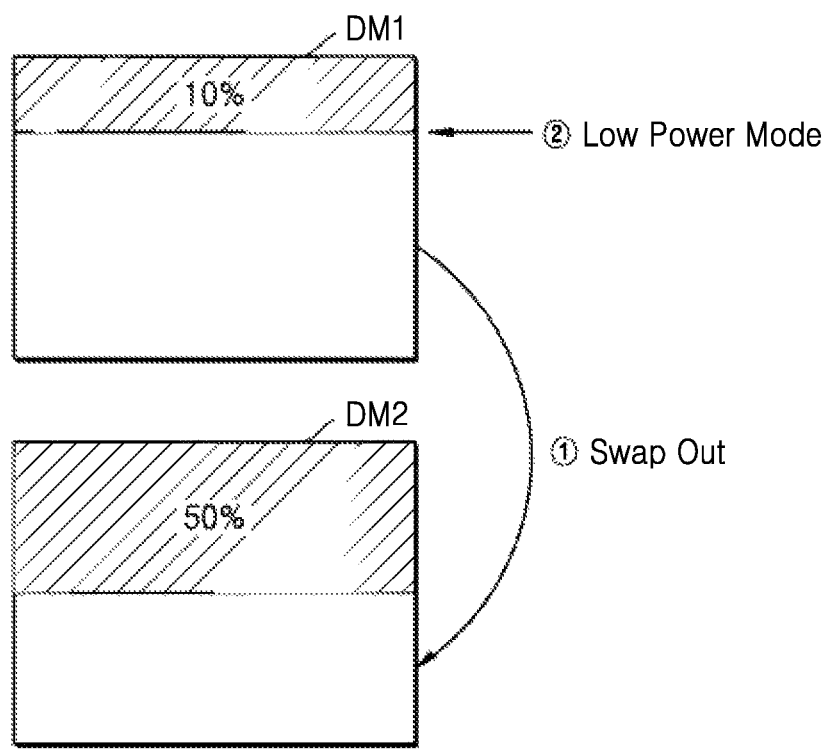

FIGS. 7 and 8 are diagrams for explaining data management methods according to exemplary embodiments. Referring first to FIGS. 2 and 7, the local memory 240 of the mobile device 200 according to an exemplary embodiment may include two DRAMs, that is, first and second DRAMs DM1 and DM2. In the first DRAM DM1 and the second DRAM DM2, data amounting to 10% and 50% of respective storage capacities are stored, respectively. That is, free areas in the first DRAM DM1 and the second DRAM DM2 respectively correspond to 90% and 50% of the storage capacities. The RSM may swap all of the data stored in one of the first DRAM DM1 and the second DRAM DM2, in response to second information (①). For example, the RSM may swap all of the data stored in the first DRAM DM1 of which a free area is relatively large and thus of which the amount of data to be swapped is small. However, the present exemplary embodiment is not limited thereto, and the RSM may swap the data stored in the second DRAM DM2 of which a free area is relatively small. Since the second DRAM DM2, of which all of the data are swapped, does not need to perform self-refresh, the second DRAM DM2 may enter a low power mode (②). For example, the second information may be generated when a residual power level of a battery (not shown) of the mobile device 200 is equal to or less than a reference value.

Next, referring to FIGS. 2 and 8, the local memory 240 of the mobile device 200 according to an exemplary embodiment may include two DRAMs, that is, the first and second DRAMs DM1 and DM2, like in FIG. 7. The RSM may swap all of data stored in one of the first DRAM DM1 and the second DRAM DM2 to the other DRAM, in response to second information (①). For example, the RSM may swap all of the data stored in the first DRAM DM1 of which the amount of data stored therein is small to the second DRAM DM2. Accordingly, as described above, the first DRAM DM1 that is empty may enter a low power mode (②).

Figure 9:
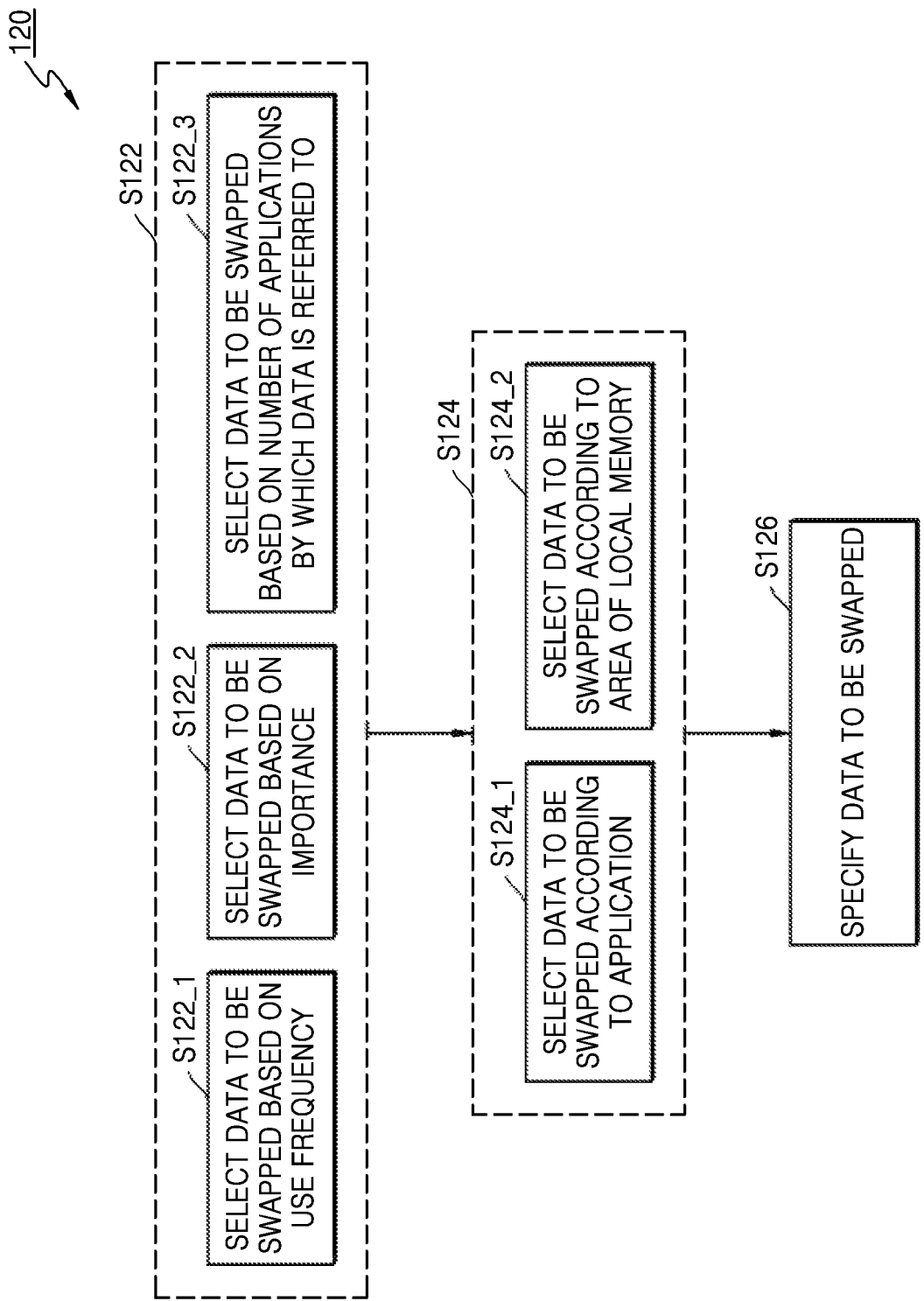
FIG. 9 is a flowchart of a method of selecting data to be swapped, according to an exemplary embodiment.

As such, the mobile device and the data management method according to an exemplary embodiment may swap data stored in a local memory selected from among a plurality of local memories and may enable the local memory that is empty to enter a low power mode, thereby reducing power consumption. FIG. 9 is a flowchart of a method S120 of selecting data to be swapped, according to an exemplary embodiment. Referring to FIGS. 2 and 9, the method S120 may include operation S122 in which data is selected according to characteristics of the data, operation S124 in which data is selected according to a unit of the data, and operation S126 in which data to be swapped is specified.

Operation S122 in which data is selected according to characteristics of the data may include operation S122_1 in which data is selected according to a use frequency of the data, operation S122_2 in which data is selected based on an importance of the data, and operation S122_3 in which data is selected based on the number of applications by which the data is referred to. In a case 122_1 where data is selected based on a use frequency of the data, the RSM may select data that is not used for a long time or may select inactive data that is not used for a predetermined period of time. In a case 122_2 where data is selected based on an importance of the data, the RSM may set that metadata has a higher importance than user data, and even when times for which the metadata and the user data are not used are the same, may select the user data having a lower importance as data to be swapped. In a case 122_3 where data is selected based on the number of applications by which the data is referred to, the RSM may select data that is referred to by a smaller number of applications. The RSM may take into account all of the three cases 122_1 through 122_3 of FIG. 9 or may take into account only one of the three cases 122_1 through 122_3 in order to select data to be swapped according to characteristics of the data. Alternatively, when the RSM considers all of the three cases 122_1 through 122_3 of FIG. 9, weight values or priorities of the three cases 122_1 through 122_3 may be different from one another.

Operation S124 in which data to be swapped is selected according to a unit of the data may include operation S124_1 in which data is selected according to an application and operation S124_2 in which data is selected according to a first area in the local memory 240. In a case 124_1 where data to be swapped is selected according to an application, the RSM may select all of data that are used in the same application. The data that are used in the application may be distinguished by page. However, data or a page that is referred to by other applications may not be selected. In a case 124_2 where data is selected according to the first area in the local memory 240, the RSM may select data to be swapped according to a sub-array unit, a bank unit, a ran unit, or a channel unit of the local memory 240.

Unlike in FIG. 9, only operation S122 in which data is selected according to characteristics of the data may be performed and then operation S126 in which data to be swapped is specified may be performed. Alternatively, only operation S124 in which data is selected according to a unit of the data may be performed and then operation S126 in which data to be swapped is specified may be performed. As such, the mobile device 200 and the data management method according to an exemplary embodiment swaps data having a low re-use probability that is selected based on characteristics of the data according to an application or the like, thereby avoiding power consumption for frequent swap operations (swap-out and swap-in operations).

Figure 10:
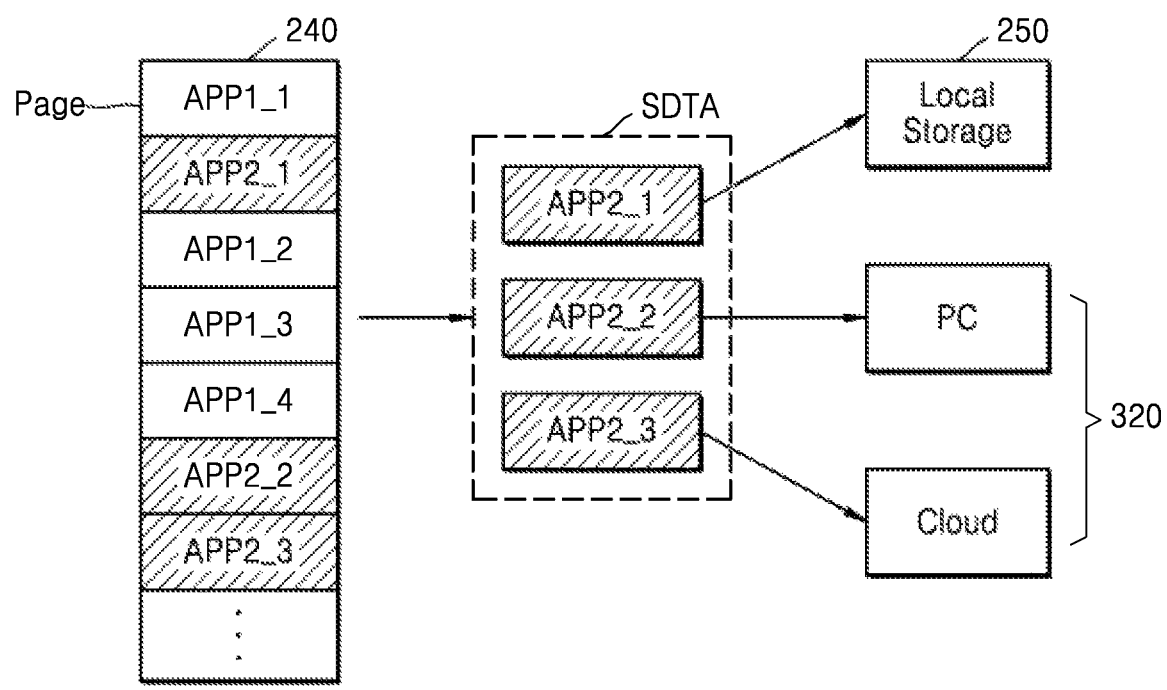
FIG. 10 is a block diagram for explaining a data management method according to an exemplary embodiment.

FIG. 10 is a block diagram for explaining a data management method according to an exemplary embodiment. Referring to FIG. 10, data is stored according to a page in the local memory 240. For example, data APP1_1 through APP1_4 that are used in a first application and data APP2_1 through APP2_3 that are used in a second application are stored in the local memory 240. By using the method of selecting data of FIG. 9, the data APP2_1 that is inactive may be selected and swap data SDTA may be selected according to an application. Accordingly, the data APP2_1 through APP2_3 that are used in the second application may be specified as the swap data SDTA.

The data management method according to an exemplary embodiment may swap the swap data SDTA to the same area. Alternatively, as shown in FIG. 10, each page or some pages of the swap data SDTA that are swapped together may be swapped to different areas. FIG. 10 illustrates that the data (referred to as a page) APP2_1 may be swapped to the local storage 250 and the pieces of data (referred to pages) APP2_2 and APP2_3 that are pages may be swapped to a personal computer (PC) and a cloud that are the external memories 320. For example, since the page APP2_1 may be referred to by other applications, a re-use probability, that is, a probability that the page APP2_1 is swapped in again to the mobile device 200 from a storage area to which the page APP2_1 was swapped out, in order to be re-used by the mobile device 200 may be high. Accordingly, the RSM may swap out the page APP2_1 to the local storage 250 that is physically the closest to the local memory 240. When a physical distance to the local memory 240 is short, a time and resources used to perform a swap operation may be reduced. In contrast, the page APP2_3 having a lowest re-use probability may be swapped out to the cloud that is the external memory 320 of which time and resources used to perform a swap operation are the longest and the largest.

Although a storage area to which the swap data SDTA that is swapped together is swapped out varies according to each page of the swap data SDTA in FIG. 10, the present exemplary embodiment is not limited thereto. A storage area to which the swap data SDTA is swapped out may vary according to a re-use probability and costs for a swap operation. Also, a storage area may vary according to content of the swap data SDTA, instead of costs for a swap operation. For example, an E-mail may be swapped to a personal PC and an account book may be swapped to a company server. Alternatively, data that needs a high security level may be swapped to only an authenticated external memory. Accordingly, a storage area may vary according to attributes of the swap data SDTA.

The mobile device 200 and the data management method according to an exemplary embodiment hierarchically set memory resources that are located outside the mobile device 200 and swap data by selecting a memory that is optimized for characteristics of the data, thereby minimizing time or resources used to perform swapping.

Figure 11:
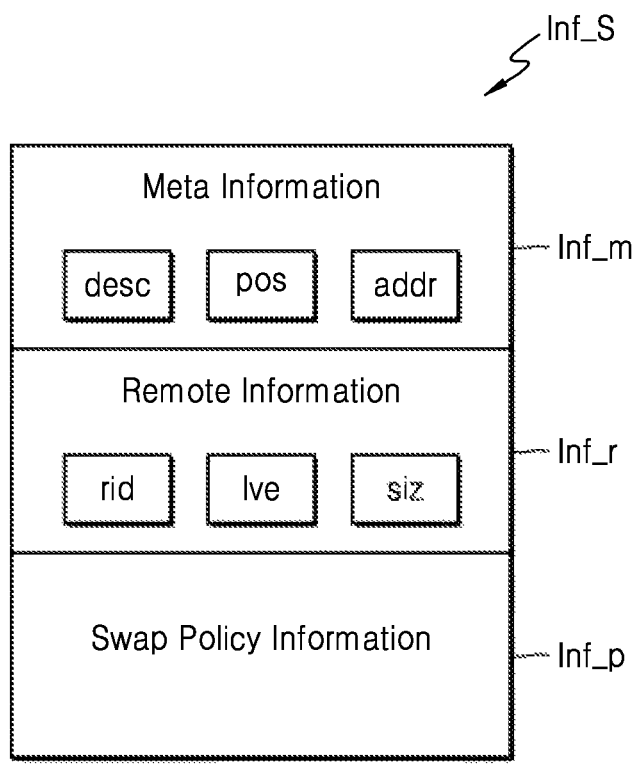
FIG. 11 is a block diagram illustrating a structure of swap information for controlling a swap operation in a remote swap manager (RSM), according to an exemplary embodiment.

FIG. 11 is a block diagram illustrating a structure of swap information for controlling a swap operation in the RSM, according to an exemplary embodiment. Referring to FIGS. 2 and 11, swap information Inf_S may include meta information Inf_m, remote information Inf_r, and swap policy information Inf_p. The meta information Inf_m includes real-time information for tracking a swapped page. For example, the meta information Inf_m may include a descriptor desc for managing a page, position information pos about whether an area in which the page is currently stored is located inside or outside the mobile device 200, and information addr about an address or an index of a position at which the page is stored. The descriptor desc may include a context such as a page identifier, whether the page is activated, the number of applications that are referred to, an identifier of a used application, whether a high security level is needed, or a right to use. In addition, the meta information Inf_m may further include information about a size of the page.

The remote information Inf_r may include an identifier rid of the external memory 320, a level lve of the external memory 320, and a size siz of the external memory 320. The level lve of the external memory 320 may be information about a level of the external memory 320 from among the plurality of external memories 320 according to costs used for a swap operation. The costs used for a swap operation may be measured according to, for example, costs according to wired/wireless connection and a latency.

The swap policy information Inf_p may store swap policy information about a condition under which swapping is performed, and data to be swapped or the external memory 320 to be swapped is selected.

Figure 12:
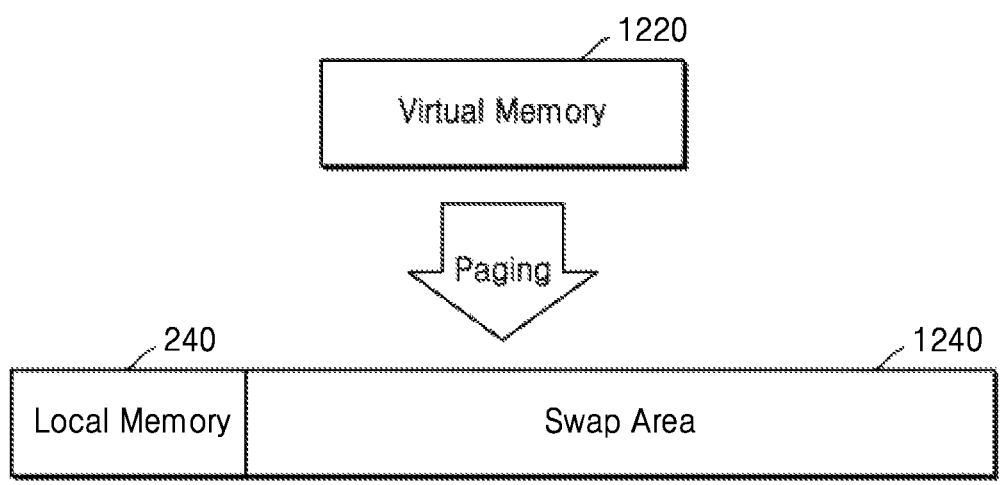
FIG. 12 is a block diagram for explaining the effect of a data management method, according to an exemplary embodiment.

FIG. 12 is a block diagram for explaining the effect of a data management method, according to an exemplary embodiment. Referring to FIGS. 2 and 12, a virtual memory 1220 for data used to operate the application processor 220 is used by the CPU 221. The virtual memory 1220 is paged or mapped to a physical memory. For example, the virtual memory 1220 having a size of 4 GB may be paged to the local memory 240 having a size of 2 GB and a swap area 1240 of which the physical size is not limited. The swap area 1240 may be the external memory 320. Alternatively, the swap area 1240 may be the local storage 250 and the external memory 320. Accordingly, since the data management method according to an exemplary embodiment supports swapping to the external memory 320, and thus, a size of the local memory 240 is greatly increased, an application that is being executed may be prevented from being killed, thereby enhancing user convenience.

Figure 13:
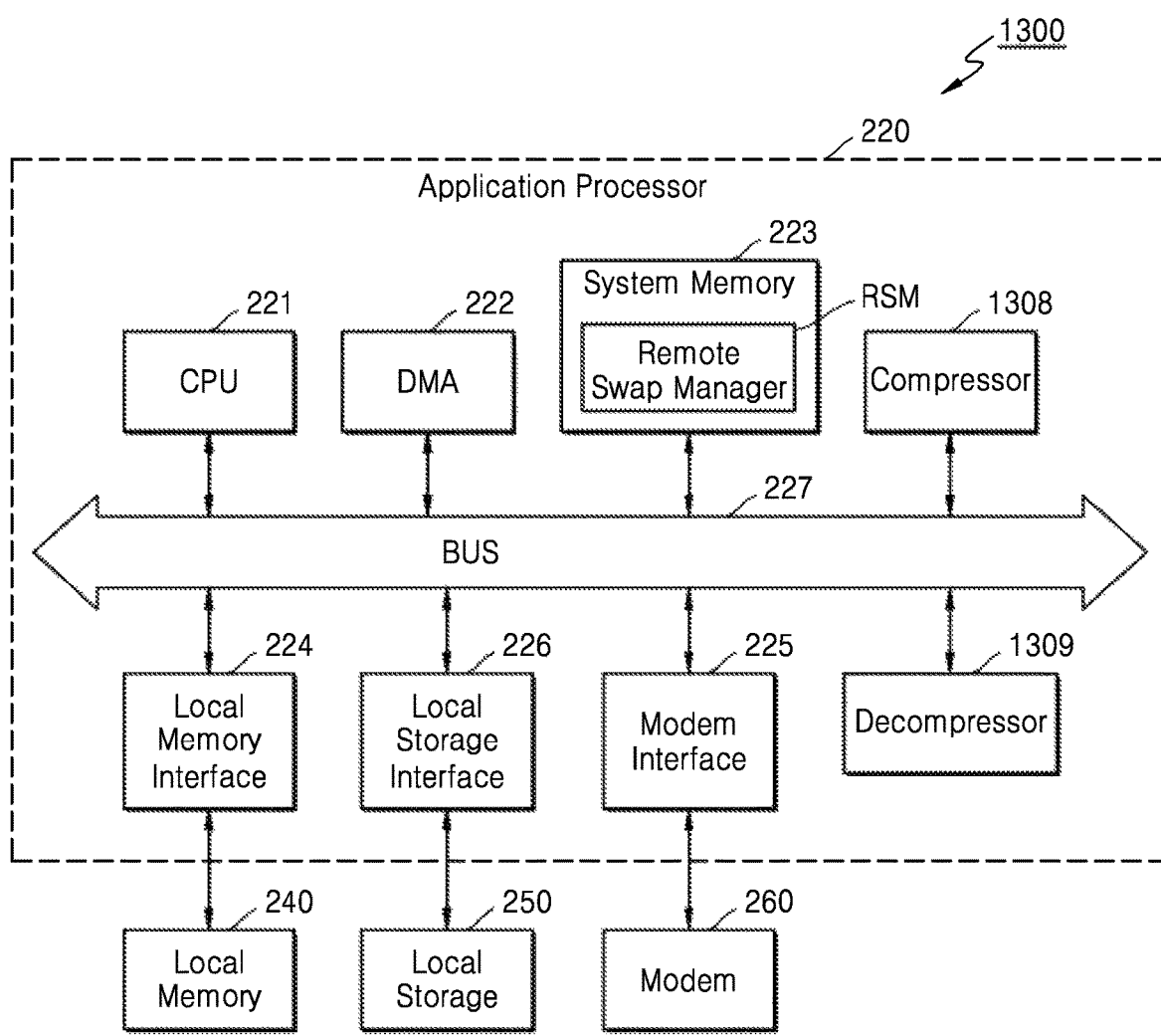
FIG. 13 is a block diagram illustrating a mobile device according to another exemplary embodiment.

FIG. 13 is a block diagram illustrating a mobile device 1300 according to another exemplary embodiment. Referring to FIG. 13, the mobile device 1300 may include the application processor 220, the local memory 240, the local storage 250, and the modem 260, like the mobile device 200 of FIG. 2. Also, the application processor 220 may include the CPU 221, the DMA 222, the system memory 223, the local memory interface 224, the local storage interface 226, the modem interface 225, and the bus 227. The application processor 220 of the mobile device 1300 of FIG. 13 may further include a compressor 1308 and a decompressor 1309. The RSM may compress, and then, swap out data and may decompress data that is compressed and swapped in. Although the compressor 1308 and the decompressor 1309 are provided separate from each other in FIG. 10, the present exemplary embodiment is not limited thereto, and the compressor 1308 and the decompressor 1309 may be integrated. Also, the compressor 1308 and the decompressor 1309 may be implemented in one of the above elements constituting the mobile device 1300, e.g., the system memory 223.

Figure 14:
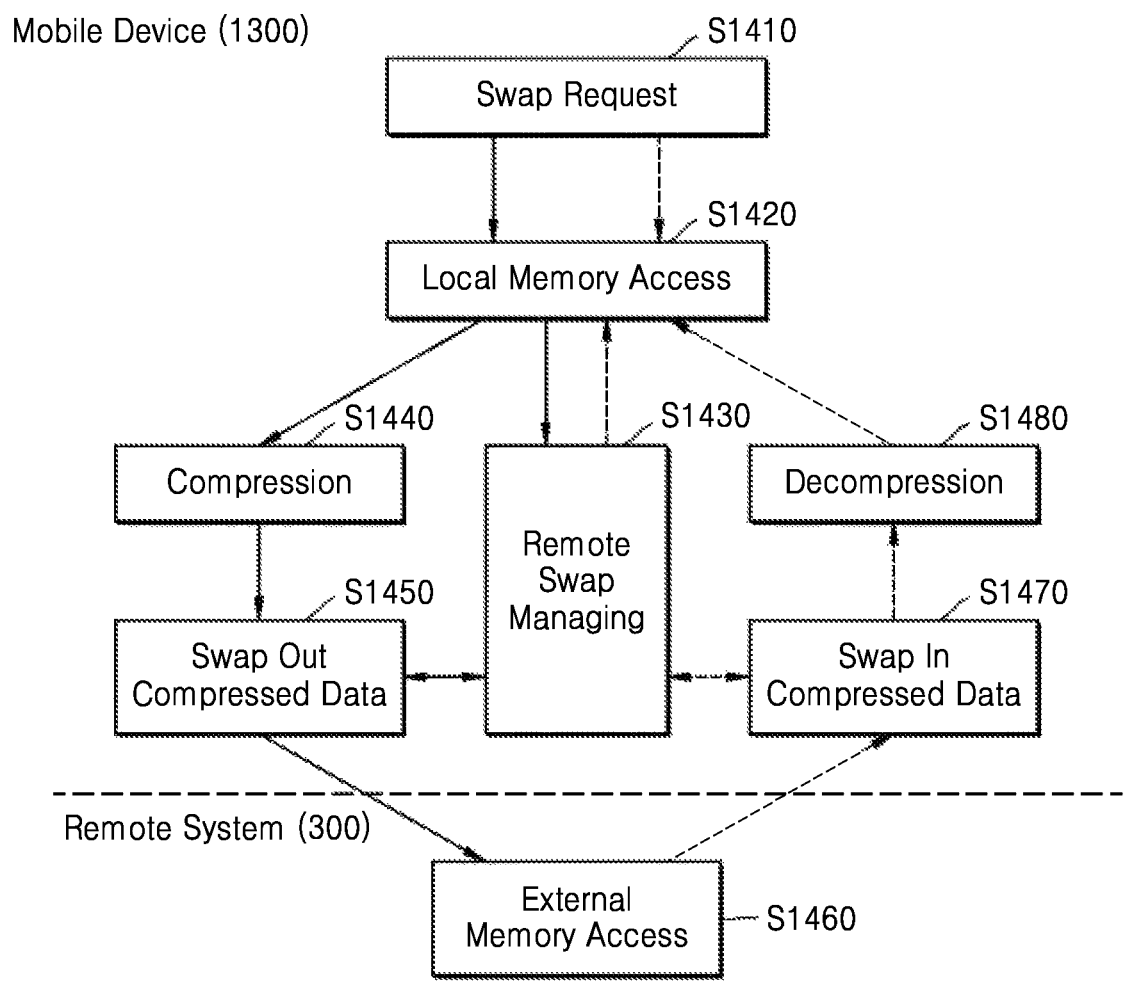
FIG. 14 is a flowchart of a data management method of the mobile device of FIG. 13, according to an exemplary embodiment.

FIG. 14 is a flowchart of a data management method of the mobile device 1300 of FIG. 13. Referring to FIGS. 13 and 14, in operation S1410, a virtual memory manager (not shown) that may be loaded to the system memory 223 may transmit a swap request to the local memory 240. For example, a function swap_writepage( ) for a swap request may be called by the virtual memory manager. Once the function swap_writepage( ) is called, a function submit_bio( ) instructing to perform swapping may be called. The function swap_writepage( ) and the function submit_bio( ) may be called in order to swap in data that is swapped out. The function swap_writepage( ) and the function submit_bio( ) may be functions that are used in Linux.

When a swap-out operation is performed as marked by a solid line, in operation S1420, access to the local memory 240 may be performed in response to the swap request. In this case, in operation S1430, data to be swapped may be managed by the RSM. In operation S1440, the compressor 1308 may compress the data to be swapped, and in operation S1450, the compressor 1308 may swap out the data to be swapped. In operation S1430, swap information Inf_s about a page that is swapped out may be generated or updated by the RSM.

In operation S1460, access to the external memory 320 is performed in order to store the swapped-out data. Even when data that is stored in the external memory 320 is swapped in as marked by a dashed line, in operation S1460, access to the external memory 320 is performed. In operation S1470, the compressed data is swapped in. In operation S1480, the decompressor 1309 decompresses the compressed data. In operation S1420, the decompressed data may be re-written to the local memory 240. In operation S1430, swap information Inf_S about data that is swapped in by the RSM and is stored in the local memory 240 may be updated. As described earlier, the swap information Inf_S may be set according to a page.

However, even when the function swap_writepage( ) is called, the RSM of the mobile device 1300 according to an exemplary embodiment may perform or kill an arbitrary application without performing a swap-out operation or may control data requested to be swapped in to be newly generated without performing a swap-in operation.

Figure 15:
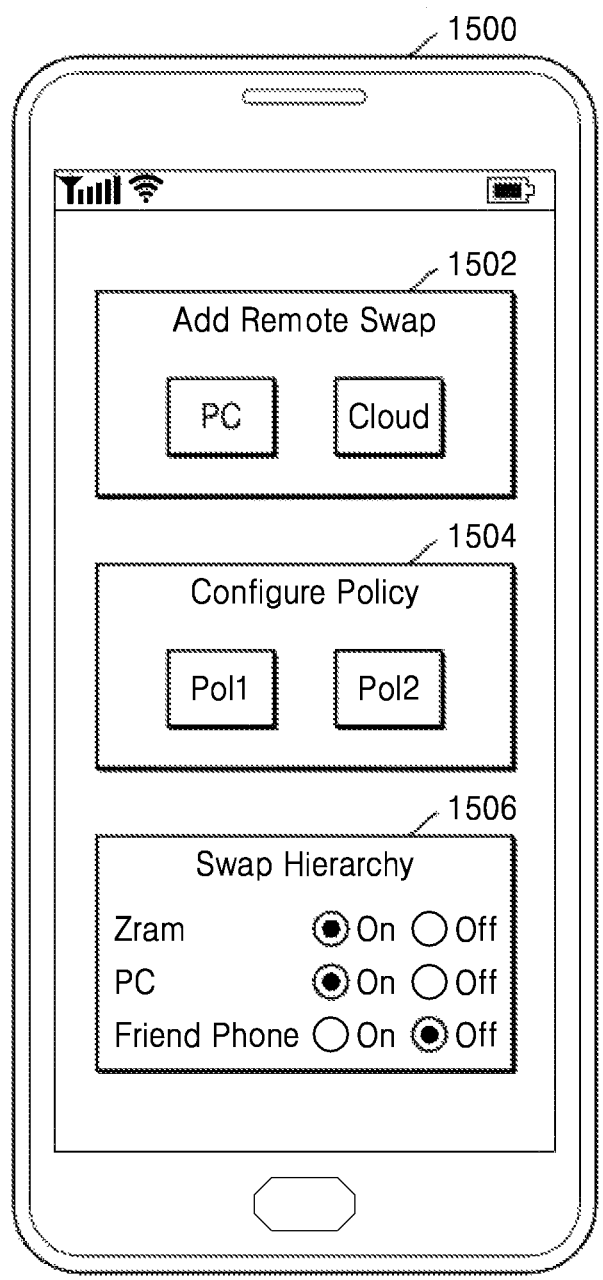
FIGS. 15 through 17 are diagrams illustrating mobile devices according to other exemplary embodiments.

FIG. 15 is a view illustrating a mobile device 1500 according to another exemplary embodiment. Referring to FIG. 15, the mobile device 1500 may be a smartphone. The smartphone may provide a user interface (UI) about selection of one of a plurality of external memories and a swap state, that is, about remote swapping. For example, the UI may include an interface 1502 through which the external memory 320 may be added, an interface 1504 through which a swap policy may be set, and an interface 1506 through which a swap state is indicated. The user may provide an interface through which a PC or a cloud may be added as the external memory 320 through the interface 1502 through which the external memory 320 may be added, or the user may add the external memory 320 by directly inputting the external memory 320. The user may set a swap policy of FIGS. 6, 9, and 10 through the interface 1504 by which the swap policy may be set. The user may also set on-off of each swap area through the interface 1506 through which a swap state is indicated.

Figure 16:
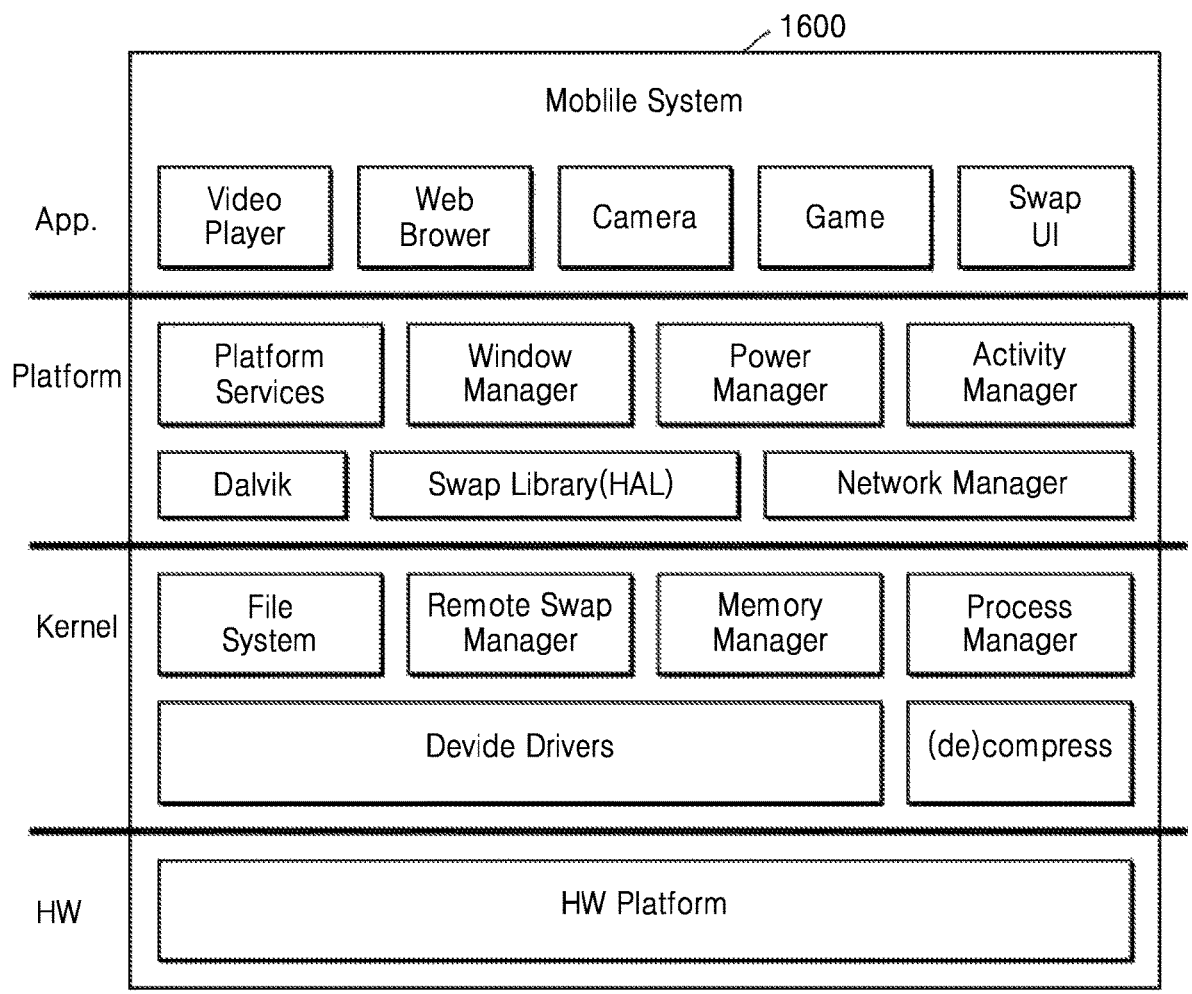

FIG. 16 is a block diagram illustrating a mobile device 1600 according to another exemplary embodiment. Referring to FIG. 16, the mobile device 1600 may provide a video player, a web browser, a camera, a game, and a UI for remote swapping to an application App. A platform of the mobile device 1600 that provides various libraries that are used by the application App includes a swap library for supporting remote swapping to the external memory 320. A kernel provides the RSM and a file system for performing the application App. Substantial data (e.g., a page) is transmitted and received through hardware HW. Information regarding a context of the page may be collected from the platform and the kernel. Other elements (e.g., a window manager and a process manager) that are included in the platform and the kernel of FIG. 16 provide libraries or provide file systems, and a detailed explanation thereof will not be given.

Figure 17:
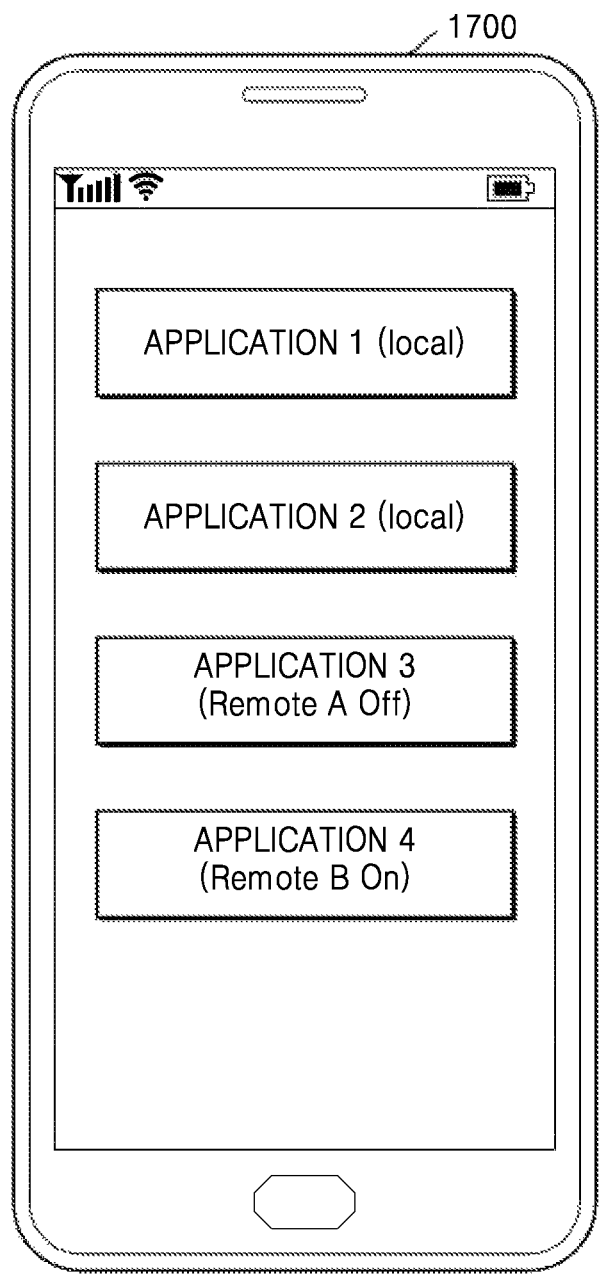

FIG. 17 is a view illustrating a mobile device 1700 according to another exemplary embodiment. Referring to FIG. 17, the mobile device 1700 of FIG. 17 may provide, to a user, information about each application, a current position of data that is used in each application, and whether each application is used through a UI for remote swapping. For example, information indicating that data used in a first application APP1 and data used in a second application APP2 are located in the local memory 240 and data used in a third application APP3 and data used in a fourth application APP4 are located in the external memory 320 may be provided to the user. Also, information indicating that the external memory 320 in which the data used in the third application APP3 is located is turned off and the external memory 320 in which the data used in the fourth application APP4 is located is turned on may be provided to the user. The UI of FIG. 17 may be provided along with or separate from the UI of FIG. 15

As such, the mobile device and the data management method of the mobile device according to an exemplary embodiment provide information about data swapping to a user by using an UI, thereby enhancing user convenience.

Figure 18:
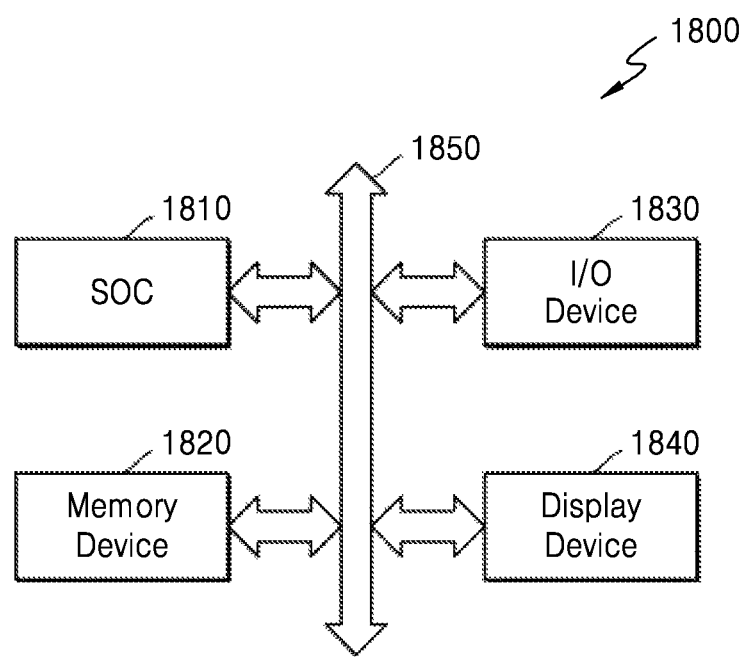
FIG. 18 is a block diagram illustrating a computing system according to an exemplary embodiment.

FIG. 18 is a block diagram illustrating a computing system 1800 according to an exemplary embodiment. Referring to FIG. 18, the computing system 1800 may further include a system-on-chip 1810, a memory device 1820, an input/output device 1830, and a display device 1840, which may be electrically connected to one another through a bus 1850. The system-on-chip 1810 of FIG. 18 may be the application processor 220 of FIG. 2.

Figure 19:
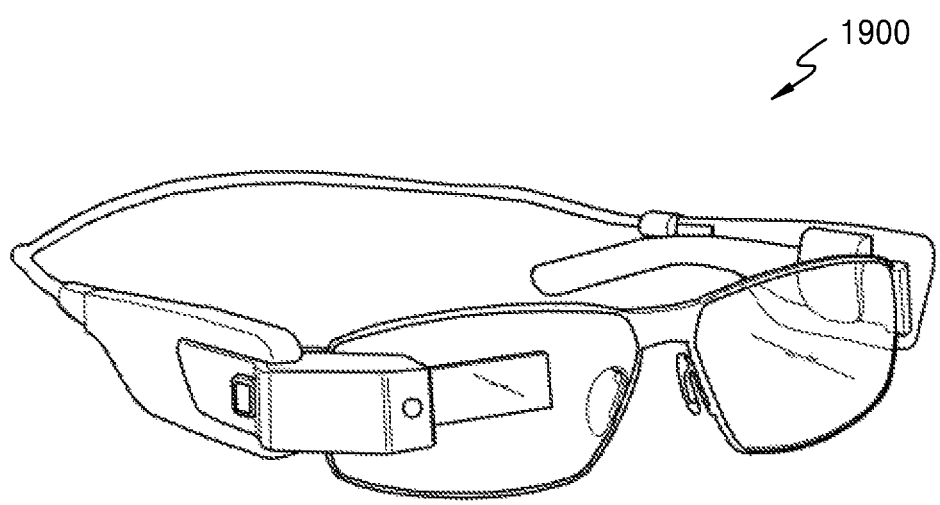
FIGS. 19 and 20 are views illustrating mobile devices according to other exemplary embodiments.
Figure 20:
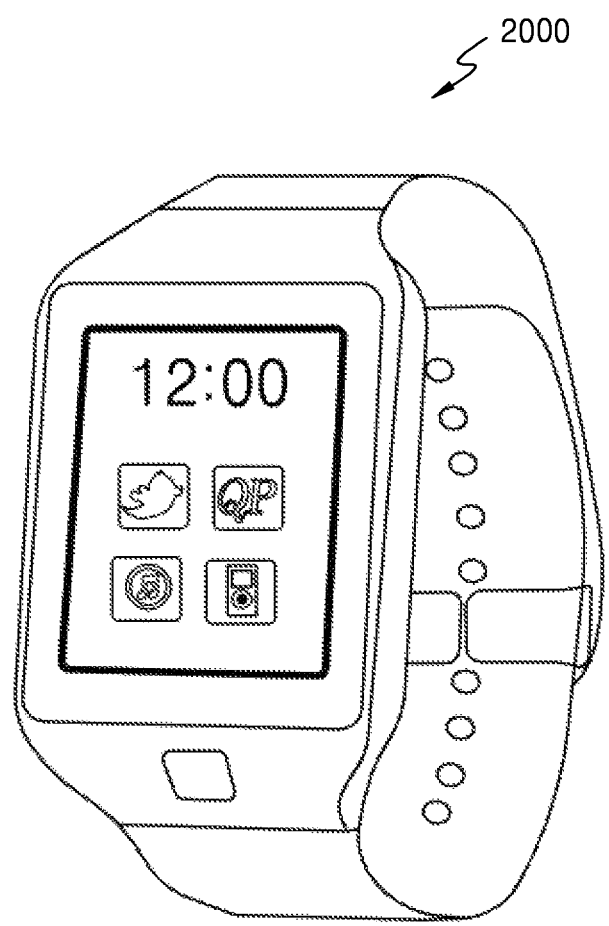

FIGS. 19 and 20 are views illustrating mobile devices 1900 and 2000 according to other exemplary embodiments. As shown in FIG. 19, the mobile device 1900 may be a wearable device, for example, smart eyeglasses. Alternatively, as shown in FIG. 20, the mobile device 2000 may be a wearable device, for example, a smart watch. Although the wearable device may have a limitation in a capacity of the local memory 240, a mobile device and a data management method of the mobile device according to an exemplary embodiment may efficiently perform an operation by swapping data to an external memory.

A mobile device and a data management method of the mobile device according to an exemplary embodiment may enhance user convenience by swapping data by using a memory resource that is located outside the mobile device without killing an application that is being executed.

A mobile device and a data management method of the mobile device according to an exemplary embodiment may prevent the lifetime or performance of a storage that is located inside the mobile device from being reduced by swapping data by using a memory resource that is located outside the mobile device.

A mobile device and a data management method of the mobile device according to an exemplary embodiment may avoid power consumption for frequent swap-out or swap-in operations by simultaneously swapping according to application data that is selected based on characteristics of the data and has a low re-use probability.

A mobile device and a data management method of the mobile device according to an exemplary embodiment may minimize a time and resources used for swapping by hierarchically setting memory resources that are located outside the mobile device and swapping data by selecting a memory that is optimized for data characteristics and the like.

A mobile device and a data management method of the mobile device according to an exemplary embodiment may avoid power consumption by swapping data stored in a local memory that is selected from among a plurality of local memories and causing the local memory that is empty to enter a low power mode.

A mobile device and a data management method of the mobile device according to an exemplary embodiment may further enhance user convenience by providing information about data swapping to a user by using a UI.

While the inventive concept has been particularly shown and described with reference to exemplary embodiments thereof, it will be understood by those of ordinary skill in the art that various changes in form and detail may be made therein without departing from the spirit and scope of the inventive concept as defined by the following claims. The exemplary embodiments should be considered in a descriptive sense only and not for purposes of limitation. Therefore, the scope of the inventive concept is defined not by the detailed description of the exemplary embodiments but by the appended claims, and all differences within the scope will be construed as being included in the inventive concept.

What is claimed is:

1. A data management method processed by a central processing unit (CPU) of a mobile device, the data management method comprising:
    waiting for a non-periodic interrupt;
    generating first information that indicates a request to perform swapping on data stored in a local memory of the mobile device, in response to the non-periodic interrupt;
    selecting data to be swapped from among the data stored in the local memory of the mobile device, in response to the first information;
    selecting one of at least two external memories which are located outside the mobile device and have different hierarchical levels;
    swapping the selected data to the selected one of the at least two external memories; and
    not killing all applications that are executed in the mobile device and maintaining a state where all of the applications are executed while swapping the selected data.

2. The data management method of claim 1, further comprising:
    periodically checking a size of a free area in the local memory; and,
    generating the request in response to the size of the free area in the local memory being equal to or less than a reference value.

3. The data management method of claim 1, further consisting of generating the request in response to determining that certain data stored in the local memory is not to be used for a reference period of time or longer, a free area does not exist in the local memory, or an instruction to perform the swapping is received from a user.

4. The data management method of claim 1, wherein the local memory comprises at least two dynamic random-access memories (DRAMs) comprising a first DRAM and a second DRAM,
    wherein the data management method further comprises generating the request in response to determining that at least one of the at least two DRAMs is to operate in a low power mode.

5. The data management method of claim 4, wherein the selected data is stored in the first DRAM having a larger free area than the second DRAM, and
    wherein the swapping comprises swapping the selected data from the first DRAM to the second DRAM.

6. The data management method of claim 1, wherein the selecting the data to be swapped comprises selecting the data to be swapped based on characteristics of the data stored in the local memory.

7. The data management method of claim 1, wherein the selecting the data to be swapped comprises selecting the data to be swapped based on a unit of the data stored in the local memory.

8. The data management method of claim 1, wherein the selecting the data to be swapped comprises selecting all data which are used in a same application.

9. The data management method of claim 1, wherein the selecting one of the at least two external memories comprises selecting one of the at least two external memories based on a re-use probability of the selected data.

10. The data management method of claim 1, further comprising setting a hierarchical level of each of the at least two external memories based on at least one of a distance between each of the at least two external memories and the mobile device, and a resource used for the swapping.

11. The data management method of claim 1, wherein the data to be swapped is selected according to swap information, and
    wherein the swap information includes meta information, which includes real-time information for tracking a swapped page; remote information about a level of the one of the at least two external memories; and swap policy information indicating which data to be swapped.

12. The data management method of claim 1, further comprising swapping the selected data to a local storage which is electrically connected to the mobile device before the swapping the selected data to the selected one of the at least two external memories.

13. The data management method of claim 12, further comprising swapping the selected data swapped to the local storage to the selected one of the at least two external memories.

14. The data management method of claim 1, further comprising providing a user interface (UI) indicating a state of the swapping and the selecting one of the at least two external memories to a user.

15. A data management method in a mobile device, the data management method comprising:
    determining whether an event has occurred or occurs, wherein the event includes at least a non-periodic interrupt;
    generating first information that indicates a request to perform swapping on data stored in a local memory, in response to the event that includes at least the non-periodic interrupt,
    selecting data to be swapped from among the data stored in the local memory which is accessed by an application processor to execute a first application in response to the first information;
    swapping the selected data to at least one another memory outside the mobile device to change an area occupied by the selected data in the local memory to a free area to be used by the first application without stopping execution of a second application which currently uses the local memory; and
    not killing all applications that are executed in the mobile device and maintaining a state where all of the applications are executed while swapping the selected data.

16. The data management method of claim 15, wherein the event further includes at least one of an existing free area in the local memory being equal to or less than a reference value, a command to stop execution of a third application which currently uses the local memory, certain data stored in the local memory being processed not to be used for a predetermined period of time or longer, and an interrupt occurring at a predetermined time interval.

17. The data management method of claim 15, wherein the swapping comprises swapping the selected data to another local memory in the mobile device, and then, swapping at least a portion of the swapped data in the another local memory in the mobile device to an external memory outside the mobile device,
    wherein the external memory outside the mobile device is connected to the mobile device through a network.

18. The data management method of claim 15, further comprising selecting the at least one another memory to which the selected data is to be swapped, based on resources required for the swapping to the at least one another memory.

19. The data management method of claim 15, wherein the selected data has a lowest frequency of use by the application processor among the data stored in the local memory.

20. A mobile device comprising:
an application processor configured to control execution of at least one application; and
a local memory to which data requested to execute the at least one application is loaded, wherein the application processor comprises:
  a remote swap manager configured to, while maintaining a state where all of the at least one application is executed in the mobile device, control an operation of swapping out data, selected from among data stored in the local memory, to an external memory located outside the mobile device or an operation of swapping in the data, swapped out to the external memory, to the local memory;
  a compressor configured to compress the data swapped out to the external memory; and
  a decompressor configured to decompress the data swapped in from the external memory,
wherein the remote swap manager does not kill all applications that are executed in the mobile device and maintain a state where all of the applications are executed while swapping the selected data, and
wherein the data is selected in response to first information being generated in response to a non-periodic interrupt occurring, the first information indicating a request to perform swapping on data stored in the local memory.

* * * * *